United States Patent
Kim et al.

(10) Patent No.: US 7,542,166 B2
(45) Date of Patent: Jun. 2, 2009

(54) METHOD FOR AUTOMATICALLY EXTRACTING IMAGE EFFECT COLOR AND RECOVERING ORIGINAL IMAGE COLOR

(75) Inventors: Hyeon Jun Kim, Sungnam (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 876 days.

(21) Appl. No.: 10/889,175

(22) Filed: Jul. 13, 2004

(65) Prior Publication Data

US 2004/0240731 A1    Dec. 2, 2004

Related U.S. Application Data

(63) Continuation of application No. 09/496,956, filed on Feb. 3, 2000, now Pat. No. 6,816,289.

(30) Foreign Application Priority Data

Mar. 4, 1999   (KR) .................................. 1999-7064

(51) Int. Cl.
*G06F 15/00* (2006.01)
*G06K 1/00* (2006.01)
*H04N 1/60* (2006.01)
*G06F 3/12* (2006.01)

(52) U.S. Cl. ...................................... 358/1.9; 358/1.15
(58) Field of Classification Search ................. 358/1.9, 358/1.15; 382/162
See application file for complete search history.

(56) References Cited

U.S. PATENT DOCUMENTS 5,432,863 A    7/1995    Benati et al. ................. 382/167

(Continued)

FOREIGN PATENT DOCUMENTS

CN    1208483    2/1999

(Continued)

OTHER PUBLICATIONS

Chinese Search Report dated Dec. 1, 2006 (and English translation thereof).

(Continued)

*Primary Examiner*—Douglas Q Tran
(74) *Attorney, Agent, or Firm*—KED & Associates, LLP

(57) ABSTRACT

The present invention relates to an effect color extracting method of an image and an image original color recovering method which are capable of automatically extracting an effect color of an image pictured in accordance with an environment of a certain illumination and a color lens (or filter) and a feature of a camera, adjusting the extracted effect color and recovering an original image color of the image for thereby enhancing a performance of an image search. In the method for recovering an image color pictured based on a certain effect of an original color or other colors or an effect color in accordance with a feature of a camera and a surrounding environment of an object, an image color recovering method includes the steps of comparing all pixels of a frame of the image and a first critical value, obtaining an average hue value Hue_Ave with respect to the hues of the pixels each having a crominance smaller than the first critical value, computing a hue corresponding to the average hue value Hue_Ave, and determining the computed hue as an effect color, and compensating the image color affected by the effect color using the computed hue and adjusting the image color to an original color.

16 Claims, 2 Drawing Sheets

U.S. PATENT DOCUMENTS

| | | | |
|---|---|---|---|
| 5,495,428 A * | 2/1996 | Schwartz | 382/164 |
| 5,537,228 A * | 7/1996 | Dillinger | 358/502 |
| 5,768,403 A | 6/1998 | Suzuki et al. | 358/2.1 |
| 5,841,951 A * | 11/1998 | Shu et al. | 358/1.9 |
| 5,900,953 A | 5/1999 | Bottou et al. | 358/540 |
| 5,930,009 A | 7/1999 | Sato et al. | 358/518 |
| 6,169,998 B1 * | 1/2001 | Iwasaki et al. | 715/202 |
| 6,424,738 B1 | 7/2002 | Katsumura et al. | |
| 6,462,835 B1 | 10/2002 | Loushin et al. | 358/1.9 |
| 6,674,897 B1 * | 1/2004 | Sugisaki et al. | 382/166 |

FOREIGN PATENT DOCUMENTS

| | | |
|---|---|---|
| EP | 0477524 A2 | 4/1992 |
| JP | 01-191971 | 8/1989 |
| JP | 2-63394 | 3/1990 |
| JP | 06-046449 | 2/1994 |
| JP | 07-298080 | 11/1995 |
| JP | 08-275194 | 10/1996 |
| JP | 96-42257 | 12/1996 |
| JP | 09-266538 | 10/1997 |
| KR | 1998-02299 | 6/1998 |
| WO | WO96/34259 | 4/1995 |

OTHER PUBLICATIONS

Japanese Office Action dated Aug. 22, 2006.

* cited by examiner

METHOD FOR AUTOMATICALLY EXTRACTING IMAGE EFFECT COLOR AND RECOVERING ORIGINAL IMAGE COLOR

This application is a Continuation Application of U.S. patent application Ser. No. 09/496,956, filed Feb. 3, 2000 (now U.S. Patent. 6,816,289), the subject matter of which is incorporated herein by reference.

BACKGROUND OF THE INVENTION

1. Field of the Invention

The present invention relates to an image color extracting and recovering method, and a database generation and image searching method which are capable of automatically extracting an effect color of an image (which affects an original image color) pictured by a camera in accordance with an illumination condition and a color lens (or color filter) and a feature of the camera and processing the extracted effect color for thereby recovering an original image color.

2. Description of the Background Art

Generally, an image color of an object pictured using a certain camera (for example a digital camera, a video camera, etc.) may have an original color of an object and different image colors in accordance with a surrounding environment of the object and a feature of the camera.

Namely, in the case that an object is pictured under an artificial illumination or pictured using a color filter mounted at the camera, an image color of an object pictured using the camera having different features according to a manufacturing company of the camera has a different color due to an effect with respect to the pictured image color. For example, if a white color clothes (for example, a wedding dress) under a yellow illumination is pictured using the camera, the white color clothes has a yellow-white color. Namely, the image color pictured using the camera has different image colors from those of the original image colors in accordance with the surrounding environment and the feature of the camera.

However, in the conventional image searching method, it is impossible to recover the original image color by correcting the image color which is different in accordance with the surrounding environment and the feature of the camera.

SUMMARY OF THE INVENTION

Accordingly, it is an object of the present invention to provide an image color recovering method for extracting an effect color which affects a pictured image color and correcting the extracted color irrespective of a surrounding environment of an object and a feature of a camera for thereby recovering an original color of the image.

It is another object of the present invention to provide an image color automatic extracting method which is capable of extracting an effect color which affects a pictured image color irrespective of a surrounding environment of an object and a feature of a camera.

It is still another object of the present invention to provide an image database formation method which is capable of extracting an effect color which affects a pictured image color irrespective of a surrounding environment of an object and a feature of a camera, correcting the extracted color for thereby storing the image as an original color image.

It is still another object of the present invention to provide an image searching method which is capable of comparing an image obtained by extracting an effect color which affects a pictured image color irrespective of a surrounding environment of an object and a feature of a camera correcting the extracted color and an image stored in an image database and searching a generated image.

To achieve the above object, there is provided an image color recovering method in a method for recovering an image color pictured based on a certain effect of an original color or other colors or an effect color in accordance with a feature of a camera and a surrounding environment of an object, which method includes the steps of comparing all pixels of a frame of the image and a first critical value, obtaining an average hue value Hue_Ave with respect to the hues of the pixels each having a chrominance smaller than the first critical value, computing a hue corresponding to the average hue value Hue_Ave, and determining the computed hue as an effect color, and compensating the image color affected by the effect color using the computed hue and adjusting the image color to an original color.

To achieve the above objects, there is provided an image color extracting method, in a method for extracting an effect color of an image affected by an effect color or any colors other than an original color owing to a feature of a camera and a surrounding environment of an object, which method includes the steps of: extracting a hue element of the pixels with respect to all pixels which form a frame of the image, generating a histogram with respect to the hue elements, and computing a maximum hue value Hue_Max based on the histogram; comparing the maximum hue value Hue_Max and a previously set first critical value, judging that there is an effect color which affects the image color when the maximum hue value Hue_Max is larger than a first critical value as a result of the comparison, dividing the image frame into grids, and generating the hue of each grid with respect to the grid having a chrominance smaller than the second critical value among the grids; and judging a hue corresponding to the average hue value with respect to the hues generated based on the grids as an effect color of the image when a difference hue value Hue_Diff between the average hue value Hue_Ave and the maximum hue value Hue_Max with respect to the hues generated from the grids is smaller than a third critical value.

In the image database formation method according to the present invention, a certain image is received, and the inputted image is processed to have an original color by an image color recovering method or an image color automatic extracting method according to the present invention.

In the present invention, the image searching method includes the steps of receiving a certain image and generating an image database for processing the inputted image to have an original color or storing the same based on a certain process, processing the currently inputted image by a certain process and generating an image having an original color, and comparing the current image processed to have an original color and an image stored in the image database.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
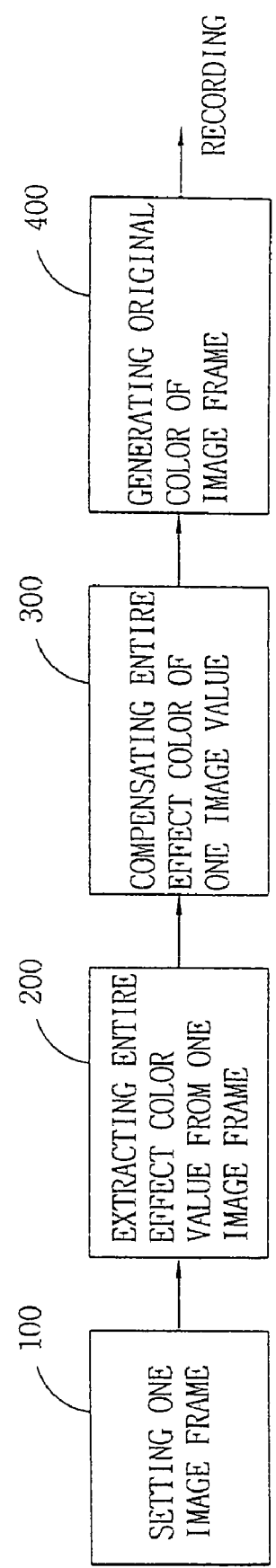
FIG. 1 is a flow chart illustrating an image database generating method by recovering an original image color according to the present invention.

FIG. 1 illustrates a method for generating a database by recovering an original image color according to the present invention which includes a step ST100 for inputting an image frame pictured by an image display apparatus, a step ST200 for extracting an effect color which affects an image color from the inputted image frame, a step ST300 for compensating the thusly extracted effect color to the image color, and a step ST400 for generating an image having an original image color and processing the same as a data and recording the data onto a certain recording medium.

Figure 2:
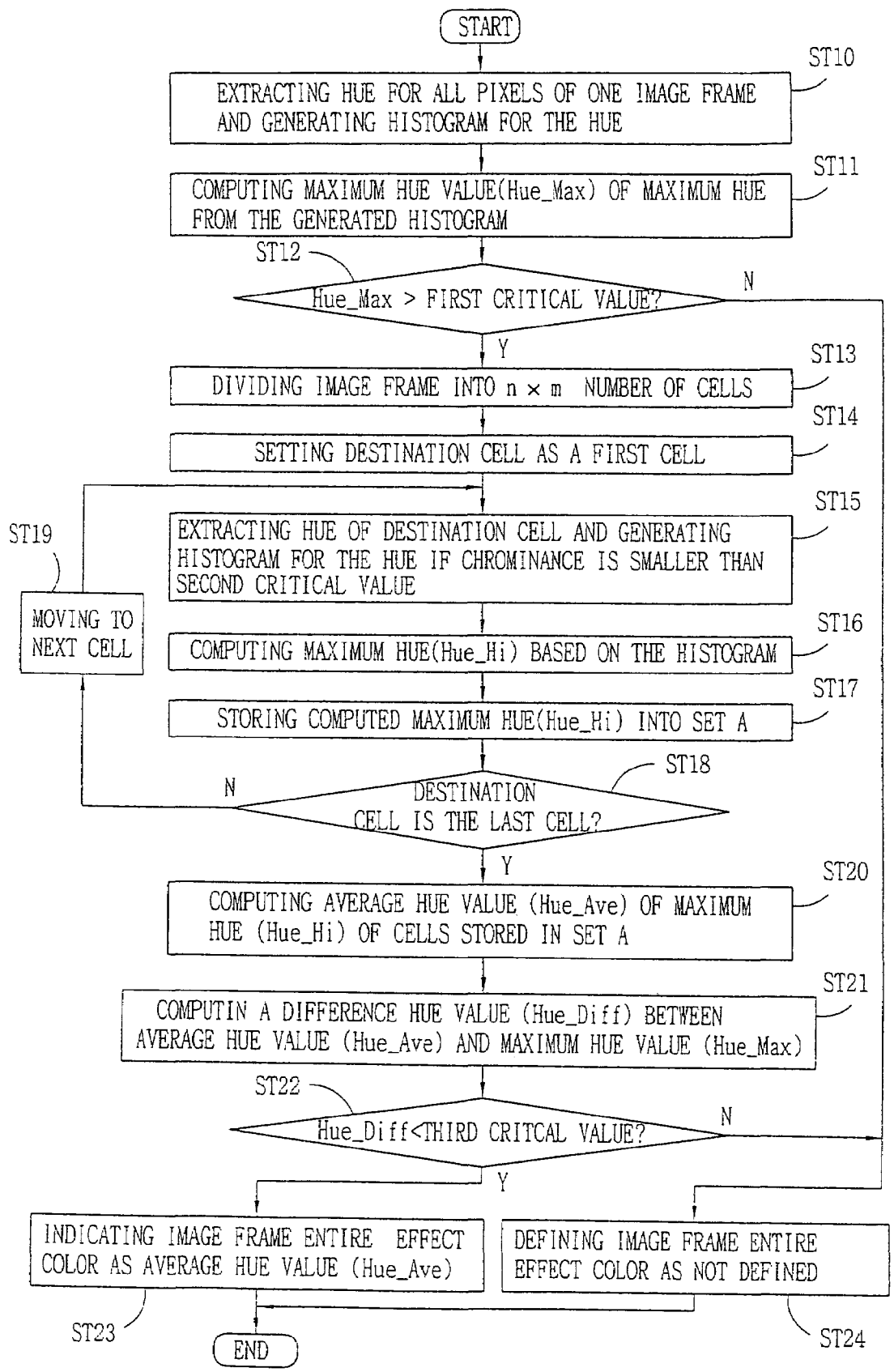
FIG. 2 is a flow chart illustrating an effect color automatic extracting method of an image according to the present invention.

FIG. 2 is a flow chart illustrating an effect color automatic extracting method of an image according to the present invention.

A hue element is extracted with respect to all pixels in an image frame, and a histogram is formed with respect to the hue element in Step ST10, and the maximum hue value Hue_Max of the formed hue element is computed in Step ST11.

The thusly computed maximum hue value Hue_Max and a previously set first critical value are compared in Step ST12. As a result of the comparison, if the computed maximum hue value Hue_Max is smaller than the first critical value, it is assumed that there is not a color(image effect color) that a hue corresponding to the maximum hue value affects the image in Step ST24.

If the computed maximum hue value Hue_Max is larger than the first critical value, it is assumed that there is an effect color that a hue corresponding to the maximum hue value Hue_Max affects the image, and the image is divided into a nxm number of cells (or grids) where n and m are certain integers) in Step ST13, and a destination cell which will be searched with respect to the divided cell is set as a first cell in Step ST14.

The hue element with respect to the pixel which satisfies a condition that the chrominance of a destination cell is smaller than the second critical value is extracted, and a histogram is formed with respect thereto in Step ST15, and the maximum hue Hue_Hi is computed based on the thusly formed histogram in Step ST16, and the computed maximum hue is stored into a certain memory set A in Step ST17. Next, the above-described routine is repeatedly performed with respect to all divided cells in Steps ST15 through ST19.

When the maximum hue Hue_hi is generated with respect to all cells obtained by dividing one image frame and is stored into the memory A, an average hue value Hue_Ave with respect to the hue stored in the memory A is computed in Step ST20.

Next, a hue difference value Hue_Diff between the computed average hue value Hue_Ave and the maximum hue value Hue_Max is computed in Step ST21. The hue difference value Hue_Diff and a previously set third critical value is compared in Step ST22. As a result of the comparison, if the hue difference value Hue_Diff is higher than the third critical value, it is judged that there is not an effect color which affects the image in Step ST24.

In addition, if the hue difference value Hue_Diff is smaller than the third critical value, it is judged that there is an effect color which affects the image color, so that the hue corresponding to the average hue value Hue_Ave is recognized as an effect color of the image color in Step ST23.

Therefore, in the effect color automatic extracting method of an image according to the present invention, it is possible to automatically extract an effect color of the inputted image.

Here, the difference value is computed by comparing the computed average hue value Hue_Ave and the maximum hue value Hue_Max may for the reason that since a possibility that an object having different hue values is positioned in one grid, the color of a certain object has a low chrominance in a state that the same is not affected by the hue of the entire effect colors and has a value which is different from the hue of the entire effect colors for thereby decreasing any effects of the average hue.

As described above, in the present invention, assuming that a certain hue affects the entire images, and an average hue value of all pixels of the image having a lower chrominance is a hue of the entire effect color, the image is uniformly divided into grids. An average of the hue value of the image pixel having a low chrominance with respect to the divided grids is computed, and then the average of the same is computed. Thereafter, the effect color is automatically obtained based on an illumination or an effect of a color lens filter from a generated image and video data.

In the above-described embodiment of the present invention, one image frame is divided into grids for thereby extracting an effect color. In another embodiment of the present invention, the image frame may not be divided into grids. Namely, the first, second and third critical values may be compared with respect to all pixels of the image frame for thereby extracting the effect color.

In addition, it is possible to search an image which is currently inputted from a previously formed database without a certain error using a method for extracting an effect color of an image, correcting the extracted color and recovering an original image color according to the present invention.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An image database generation method comprising:
   receiving an image;
   extracting an effect color of the inputted image, wherein extracting the effect color includes extracting hue features, comparing the hue features with a predetermined value, determining a maximum hue value based on the extracted hue features, separately determining a maximum hue value for each of a plurality of grids of the image, determining an average maximum hue value of the plurality of grids based on the separately determined maximum hue values, determining a difference between the maximum hue value and the average maximum hue value, and comparing the determined difference with a critical value to determine that there is an effect color when the determined difference is less than the critical value; and
   storing the effect color of each image as each image information.

2. An image search method comprising:
   receiving an image and generating an image database by processing the received image to have an original color and storing the same;
   processing the currently inputted image by an image extracting process and generating an image having an original color, wherein processing the currently inputted image includes extracting hue features, comparing the hue features with a predetermined value, determining a maximum hue value based on the extracted hue features, determining an average maximum hue value of a plurality of grids of the image, determining a difference between the maximum hue value and the average maximum hue value, and comparing the determined difference with a prescribed value to determine that there is an effect color when the determined difference is less than the prescribed value; and comparing the current image processed to have an original color and an image stored in the image database.

3. An image search method comprising:

receiving image, and generating an image database by extracting an effect color of the received image, and storing the effect color of each image as an image information;

processing the currently inputted image and generating an effect color, wherein generating the effect color includes extracting hue features, determining a maximum hue value based on the extracted hue features, comparing the maximum hue value with a predetermined value, separately determining a maximum hue value for each of a plurality of grids of the image, determining an average maximum hue value of the plurality of grids based on the separately determined maximum hue values, determining a difference between the maximum hue value and the average maximum hue value, and determining that there is an effect color when the determined difference is less than a prescribed value;

compensating an original color of the currently inputted image using the generated effect color; and comparing the inputted image which is compensated to the original color and the image stored in the image database.

4. The method of claim 3, wherein processing the currently inputted image includes:

extracting a hue element of the pixels with respect to pixels that form a frame of the image, generating a histogram with respect to the hue elements, and computing the maximum hue value based on the histogram;

comparing the maximum hue value and a previously set first critical value, judging that there is an effect color that affects the image color when the maximum hue value is larger than the first critical value as a result of the comparison, dividing the image frame into the grids, and generating the hue of each grid with respect to the grid having a chrominance smaller than a second critical value among the grids; and judging a hue corresponding to the average hue value with respect to the hues generated based on the grids as an effect color of the image when the difference between the average hue value and the maximum hue value with respect to the hues generated from the grids is smaller than a third critical value that corresponds to the prescribed value.

5. The method of claim 4, wherein generating the hue of each grid includes:

dividing the image grid into a n x m number (n and m each represent integers) of grids when the maximum hue value is above the first critical value;

extracting a hue element with respect to grids that satisfy a condition that the chrominance of each divided grid is smaller than a second critical value and forming a histogram with respect to the extracted hue element; and generating the maximum hue as a hue of a corresponding grid based on the histogram.

6. The method of claim 3, wherein generating the effect color includes:

extracting a hue element of the pixels with respect to pixels that form a frame of the image, generating a histogram with respect to the hue elements, and computing the maximum hue value based on the histogram;

comparing the maximum hue value and the previously set first critical value, judging that there is an effect color that affects the image color when the maximum hue value is larger than the first critical value as result of the comparison, dividing the image frame into the grids, and generating the hue of each grid with respect to the grid having a chrominance smaller than a second critical value among the grids; and judging a hue corresponding to the average hue value with respect to the hues generated based on the grids as an effect color of the image when the difference between the average hue value and the maximum hue value with respect to the hues generated from the grids is smaller than a third critical value that corresponds to the prescribed value.

7. The method of claim 6, wherein generating the hue of each grid includes:

dividing the image grid into a n x m number (n and m each represent integers) of grids when the maximum hue value is above the first critical value;

extracting a hue element with respect to grids that satisfy a condition that the chrominance of each divided grid is smaller than a second critical value and forming a histogram with respect to the extracted hue element; and generating the maximum hue as a hue of a corresponding grid based on the histogram.

8. The method of claim 3, wherein processing the currently inputted image and generating the effect color comprises:

generating a histogram with respect to hue elements;

judging that there is an effect color; and dividing an image frame into grids.

9. The method of claim 8, wherein processing the currently inputted image and generating the effect color further comprises judging a hue as the effect color based on the grids.

10. The method of claim 2, wherein processing the currently inputted image includes:

extracting a hue element of the pixels with respect to pixels that form a frame of the image, generating a histogram with respect to the hue elements, and computing the maximum hue value based on the histogram;

comparing the maximum hue value and a previously set first critical value, judging that there is an effect color that affects the image color when the maximum hue value is larger than the first critical value as a result of the comparison, dividing the image frame into the grids, and generating the hue of each grid with respect to the grid having a chrominance smaller than a second critical value among the grids; and judging a hue corresponding to the average hue value with respect to the hues generated based on the grids as an effect color of the image when the difference between the average hue value and the maximum hue value with respect to the hues generated from the grids is smaller than a third critical value that corresponds to the prescribed value.

11. The method of claim 10, wherein generating the hue of each grid includes:

dividing the image grid into a n x m number (n and m each represent integers) of grids when the maximum hue value is above the first critical value;

extracting a hue element with respect to grids that satisfy a condition that the chrominance of each divided grid is smaller than a second critical value and forming a histogram with respect to the extracted hue element; and generating the maximum hue as a hue of a corresponding grid based on the histogram.

12. A method comprising:

receiving an image;

determining an effect color based on a maximum hue value, an average maximum hue value of a plurality of grids of the image, a difference between the maximum hue value and the average maximum hue value, and determining the effect color includes comparing the difference between the maximum hue value and the average maximum hue value with a prescribed value to determine that there is an effect color when the difference is less than the prescribed value; and processing the image based on the determined effect color.

13. The method of claim 12, wherein determining the effect color comprises:

extracting a hue element of the pixels with respect to pixels that form a frame of the image, generating a histogram with respect to the hue elements, and computing the maximum hue value based on the histogram;

comparing the maximum hue value and a previously set first critical value, judging that there is an effect color that affects the image color when the maximum hue value is larger than the first critical value as a result of the comparison, dividing the image frame into the grids, and generating the hue of each grid with respect to the grid having a chrominance smaller than a second critical value among the grids; and judging a hue corresponding to the average hue value with respect to the hues generated based on the grids as an effect color of the image when the difference between the average hue value and the maximum hue value with respect to the hues generated from the grids is smaller than a third critical value that corresponds to the prescribed value.

14. The method of claim 13, wherein generating the hue of each grid includes:

dividing the image grid into a n x m number (n and m each represent integers) of grids when the maximum hue value is above the first critical value;

extracting a hue element with respect to all grids that satisfy a condition that the chrominance of each divided grid is smaller than a second critical value and forming a histogram with respect to the extracted hue element; and generating the maximum hue as a hue of a corresponding grid based on the histogram.

15. The method of claim 12, wherein determining the effect color comprises:

generating a histogram with respect to hue elements;

judging that there is an effect color; and dividing an image frame into grids.

16. The method of claim 15, wherein determining the effect color further comprises judging a hue as the effect color based on the grids.

* * * * *